S. J. TAYLOR.
Seed Planter.
No. 66,910.                  Patented July 16, 1867.
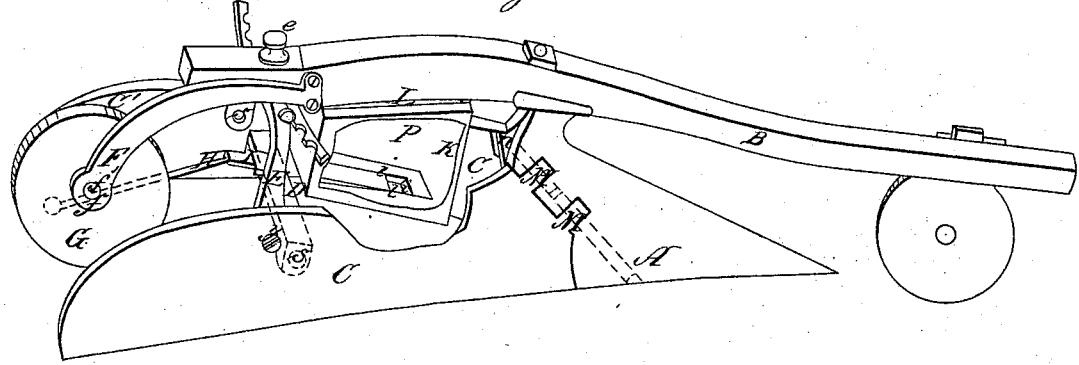
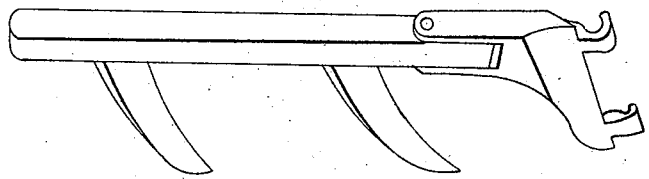
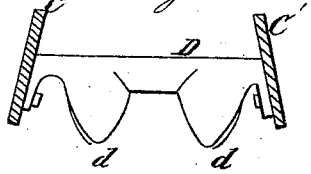
Witnesses:
Inventor:

United States Patent Office.

S. J. TAYLOR, OF ROME, NEW YORK.

Letters Patent No. 66,910, dated July 16, 1867.

---

IMPROVEMENT IN COMBINED CORN-PLANTER AND CULTIVATOR.

---

The Schedule referred to in these Letters Patent and making part of the same.

---

TO ALL WHOM IT MAY CONCERN:

Be it known that I, S. J. TAYLOR, of Rome, in the county of Oneida, and State of New York, have invented a new and useful Combined Corn-Planter, Corn-Hiller, and Cultivator; and I do hereby declare the following to be a full, clear, and exact description of the same, reference being had to the accompanying drawings, forming part of this specification, and in which—

Figure 1 represents my invention adjusted as a corn-planter, the right wing and right side of the seed-box being removed, in order to show more clearly the internal construction of the seed-box.

Figure 2 shows a detached cultivator-bar.

Figure 3 shows the cross-beam D, with its holes $d\ d$.

Similar letters of reference indicate corresponding parts in the several figures.

The object of my invention is the combination of a corn-planter, corn-hiller, and cultivator in one machine, so that it may easily be adjusted for work in either capacity, and at the same time be neat, light, and convenient to handle.

To accomplish this I construct a machine, having the plough A fitted as usual to the draw-beam B, the latter having a roller, $b$, attached to it in front of the plough. The rear edges of the two mould-boards of the plough are provided with sockets, into which hinge two side boards or wings C C'. These wings are connected together by the cross-beam D, which is provided with two covering teeth or holes $d\ d$, fastened to the cross-beam at a suitable distance from each other, and having their front faces inclined backward and inward, so as to force the dirt together as they are drawn through it, and leave it in a row behind them. The wings C C' are further connected by the adjusting-bars E E', which slide by each other in a socket on the draw-beam, and being notched on their adjacent sides are readily fastened by passing a small pin, $e$, down through the draw-beam, and through two of these notches, brought opposite to each other, thus clamping the cross-bars E E' effectually, and keeping the wings C C' firmly in position. The cross-beam D and the adjusting-bars E E' are attached to the wings by screws $s\ s\ s\ s$, and may be readily removed when necessary. Attached to the rear end of the draw-beam is a bent lever, F, pivoted at $f$, and regulated, as will readily be understood, by the bolt $f'$ at its anterior extremity. The rear end of this lever carries a wheel, G, attached to which is a crank operating the shaft H, which is hinged to the rear end of the slide I, by its motion carrying the slide I backward and forward on the bottom of the seed-box P. The slide I has aperture $i$, sufficiently large to receive the seed necessary for a single hill, and which is alternately thrust beyond the front end of the seed-box and withdrawn, thus alternately dropping the corn it contains and returning to obtain the seed for another hill. From the rear upper edge of the aperture $i$ the wood of the slide I is bevelled off gradually, as shown, between the points $i$ and $i'$ in the drawing, fig. 1. K is a vertical slide in the front end of the seed-box, held in position by the spring L. The peculiar kind of hinges which I employ to attach the wings to the plough is shown clearly in fig. 4. It will be observed that the jaws M M, clasping round the vertical bolts $n\ n$ in the rear edges of the mould-boards, enable the wings to resist any longitudinal, vertical, or lateral force while they are locked together by the cross-bars D or E E', while, by unlocking them and opening the wings till they stand perpendicular to the draw-beam, they at once detach from the plough. The cultivator-bars O O, fig. 5, are similarly attached to the plough.

The operation of a machine thus constructed will be understood at a glance when all its parts are in place.

As I have described them above, it is a corn-planter. By detaching the seed-box P, the cross-beam D, the lever F, and the wheel G, the instrument becomes a corn-hiller. By still further detaching the side boards or wings C C', and substituting in their place the cultivator-bars O O', I produce a cultivator. The parts may be separated or put together with the utmost facility.

Having thus described my invention, what I claim as new, and desire to secure by Letters Patent, is—

1. The vertical slide K, operated by the spring L, substantially as and for the purpose specified.

2. The covering-teeth $d\ d$, having faces inclined inward and backward, and attached to the cross-beam D, substantially as and for the purpose described.

3. The hinges by which the wings C C' and the cultivator-bars O O' are jointed to the plough A, composed of the jaws $m\ m$, clasping the bolts $n\ n$, substantially as and for the purpose specified.

4. The combination and arrangement of the plough A, the draw-beam B, the seed-box P, together with the wheel G for operating it, the wings C C', the cross-beam D, having its covering-teeth $d\ d$, the adjusting-bars E E', and the cultivator-bars O O', all constructed and operated substantially as and for the purpose specified.

S. J. TAYLOR.

Witnesses:
A. H. BRAINERD,
W. M. GRADY.